United States Patent [19]

Kokelenberg et al.

[11] 4,187,114

[45] Feb. 5, 1980

[54] HARDENING PROTEINACEOUS MATERIALS

[75] Inventors: Hendrik E. Kokelenberg, Merksem; Francis J. Sels, Kontich; George F. Van Veelen, Mortsel, all of Belgium

[73] Assignee: AGFA-Gevaert N.V., Mortsel, Belgium

[21] Appl. No.: 904,278

[22] Filed: May 9, 1978

[30] Foreign Application Priority Data

May 10, 1977 [GB] United Kingdom ............... 19577/77

[51] Int. Cl.² .............................................. G03C 1/30
[52] U.S. Cl. ................................ 430/510; 260/112 R; 260/117; 106/125; 430/537; 430/626
[58] Field of Search .................... 96/111, 67, 84 R; 260/117, 112 R; 106/125

[56] References Cited

U.S. PATENT DOCUMENTS

| 3,826,788 | 7/1974 | Froelich et al. | 96/111 |
| 3,992,366 | 11/1976 | Stauner et al. | 260/117 |
| 4,076,538 | 2/1978 | Smith | 96/111 |

FOREIGN PATENT DOCUMENTS 1351038  4/1974  United Kingdom ...................... 96/111

*Primary Examiner*—Won H. Louie, Jr.
*Attorney, Agent, or Firm*—William J. Daniel

[57] ABSTRACT

Proteinaceous material such as gelatin is hardened by treatment with an aqueous solution of the partial hydrolysis product of a 2,4-dichloro-6-alkoxy-S-triazine with a water-soluble tertiary phosphate and/or a water-soluble borate, wherein the 2,4-dichloro-6-alkoxy-s-triazine corresponds to the formula:

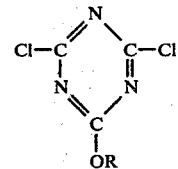

wherein R is a lower alkyl or alkoxyalkyl group.

The proteinaceous material can be a proteinaceous coating such as a photographic silver halide emulsion layer, a backing layer, a protective layer, a filter layer, or any other photographic auxiliary layer.

8 Claims, No Drawings

HARDENING PROTEINACEOUS MATERIALS

This invention relates to the hardening of proteinaceous materials, in particular gelatin, which is used as binder in photographic layers and to hardening solutions used therefor.

Various agents have been employed for hardening gelatin or other proteinaceous materials that are used as binder in photographic layers, e.g. in silver halide emulsion layers, protective coatings, subbing layers, antihalation layers, backing layers and so on. There can be mentioned: formaldehyde, chromium salts, dialdehydes, hydroxyaldehydes, chlorides of dibasic organic acids and dianhydrides of tetracarboxylic acids. Most of these compounds exhibit disadvantages such as being photographically active, or often causing fogging of the emulsions on prolonged storage. Others are responsible for a decrease of the sensitivity of the photographic emulsion. Anhydrides and acid chlorides lower the pH value of the emulsion layer, thus requiring a readjustment with alkali. Furthermore, in many cases the viscosity of the coating composition raised to an alarming degree. Other hardening agents have the disadvantage of becoming operative only after a prolonged storage time, whereas others such as formaldehyde are volatile so that an exact dosage of the quantities to be added is practically impossible.

Cyanuric chloride has been proposed as hardening agent for gelatin. However, because of the high reactivity of this compound there is an immediate and undesirable viscosity increase in the aqueous gelatin solution as well as an irreversible coagulation. In U.S. Pat. No. 3,325,287 water-soluble salts of 2,4-dichloro-6-hydroxy-s-triazine have been proposed for use as gelatin hardeners having no detrimental photographic effects, being unaffected by other additives like colour couplers, showing no after-hardening effects and imparting to gelatin high resistance to water even at elevated temperature, which is especially useful for materials to be processed at elevated temperature. The water-soluble compounds are obtained by partial hydrolysis under carefully controlled conditions of cyanuric chloride in aqueous alkaline solution e.g. aqueous sodium or potassium hydrogen carbonate. A solid salt need not be separated and the partial-hydrolysis-aqueous liquid can be added as such to the gelatin coating composition or applied to the gelatin coating.

Although the partial hydrolysis product of cyanuric chloride with sodium or potassium hydrogen carbonate is thus an advantageous hardener for photographic gelatin compositions, it has one serious drawback, namely the evolution of carbon dioxide gas bubbles not only during synthesis and during storage of the solution, but also during use, with the result that:

during storage of the hardener solution under normal conditions further evolution of carbon dioxide takes place by a continued slow hydrolysis, so that an overpressure may be built up in a closed vessel, which might give rise to an explosion, and during the hardening reaction on gelatin the carbon dioxide gas formation may entail the formation of bubbles in the hardened layer.

In U.K. Pat. No. 1,351,038 a method for hardening aqueous gelatin coating compositions has been described by incorporating besides a reactive halogen type hardener, examples of which are 2,4-dichloro-6-hydroxy-triazine-sodium salt and 2,4-dichloro-6-methoxy-s-triazine, a salt of a volatile acid that dissociates in water. As dissociatable salts the alkali metal salts of carbonic acids are cited, among which sodium hydrogen carbonate is effectively used.

In the application entitled "Hardening of proteinaceous material" filed on even data herewith (=U.K. patent application 19576/77) a method has been described wherein hardening of proteinaceous materials is carried out with an aqueous solution of a partial hydrolysis product of cyanuric chloride buffered by means of a water-soluble borate, in particular an alkali metal, e.g. sodium or potassium, or an ammonium metaborate or high homologue thereof, e.g. tetraborate.

The above partial hydrolysis product of cyanuric chloride can be formed in an aqueous alkaline medium in different ways:

1. It can be formed as described in U.S. Pat. No. 3,325,287 by dissolving cyanuric chloride in an aqueous hydrogen carbonate solution; or
2. It can be formed by contacting in an aqueous solution cyanuric chloride and a water-soluble tertiary phosphate or polyphosphate, e.g. an alkali metal (sodium or potassium) or ammonium tertiary phosphate or polyphosphate; or
3. It can be formed by contacting in an aqueous solution cyanuric chloride and a water-soluble borate, e.g. the same that is to be used for buffering purposes.

It was found, as will be illustrated hereinafter, that an aqueous solution of the partial hydrolysis product of 2,4-dichloro-6-methoxy-s-triazine obtained by means of a tertiary phosphate and/or borate has a markedly improved hardening effect on proteineous materials, in particular gelatin, compared to the combined use of sodium hydrogen carbonate with 2,4-dichloro-6-methoxy-s-triazine described in U.K. Pat. No. 1,351,038.

The present invention provides a novel hardening solution for proteinaceous compositions, in particular gelatin compositions for photographic silver halide elements, which exhibits no detrimental photographic effects, produces layers which become insoluble in aqueous solutions of varying pH or temperature, imparts to these layers a greatly increased abrasion resistance.

According to the invention hardening of proteinaceous material occurs by treatment with an aqueous solution of the partial hydrolysis product of a 2,4-dichloro-6-alkoxy-s-triazine with a water-soluble tertiary phosphate and/or borate, the said 2,4-dichloro-6-alkoxy-s-triazine corresponding to the formula:

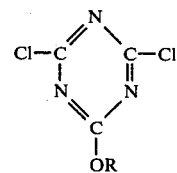

wherein R is a lower alkyl group, preferably methyl, or an alkoxyalkyl group, preferably methoxyethyl.

2,4-dichloro-6-methoxy-s-triazine can be prepared by adding methanol and water to sodium hydrogen carbonate and cyanuric chloride as described in J. Amer. Chem. Soc., 73 (1951) p. 2989. Other lower ($C_1$–$C_5$) alkoxy derivatives can be prepared by replacing the methanol in the above method by a suitable amount of lower alkanol, whereas for the alkoxy-alkoxy derivatives the methanol is replaced by a monoalkyl ether of a lower aliphatic diol e.g. by ethylene glycol monomethyl ether.

For convenience the aqueous solution of the partial hydrolysis product of the 2,4-dichloro-6-alkoxy-s-triazine will be called "the hardening solution" hereinafter.

Suitable water-soluble tertiary phosphates are the alkali metal phosphates or polyphosphates such as sodium and potassium phosphate or polyphosphate, as well as ammonium phosphate or polyphosphate. Suitable water-soluble borates are the alkali metal and ammonium metaborates and higher homologues e.g. tetraborates such as sodium and potassium metaborate or tetraborate and ammonium metaborate or tetraborate.

For carrying out the process according to the present invention in practice the hardening solution can be added to an aqueous coating composition containing as a binding agent a protein, especially gelatin. The mixture obtained is coated in the form of a layer onto a support e.g. a plastic film, paper or glass, which may have been coated with previously applied layers, and dried thereafter whereby a final hardening of the protein, especially of the gelatin, sets in. It is also possible to dip the dried materials into the hardening solution or to apply the hardening solution to the dried layers.

The invention is independent of what happens after hydrolytic splitting off of the chlorine by the tertiary phosphate or borate. It is a fact that with the aqueous hardening solution of the invention good hardenings are obtained of proteinaceous layers, especially of gelatin layers, after drying. A product might be formed e.g. corresponding to the formula:

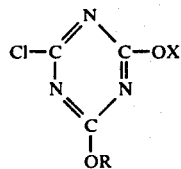

wherein
R is alkyl or alkoxyalkyl as defined hereinbefore, and X stands for

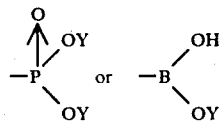

Y being sodium, potassium or ammonium.

The aqueous hardening solutions according to the present invention possess a lower reactivity than the cyanuric chloride cited above so that the addition thereof to aqueous gelatin solutions only moderately influences the viscosity of the solutions and no immediate and irreversible coagulation takes place, as occurs when cyanuric chloride alone is used. The hardening solution does not give rise to formation of carbon dioxide gas as do the salts of 2,4-dichloro-6-hydroxy-s-triazine formed in hydrogen carbonate solutions, so that foaming of the hardening solutions is avoided and the hardening solutions can be stored in closed vessels without any risk of explosion. Moreover, there is no risk of bubble-formation in the gelatin layers. As already referred to hereinbefore, the hardening solution of the present invention has a markedly improved hardening effect compared with the combined use of 2,4-dichloro-6-methoxy-s-triazine and sodium hydrogen carbonate and with the partial hydrolysis product of 2,4-dichloro-6-methoxy-s-triazine formed in aqueous sodium hydrogen carbonate.

The hardening solution used according to the present invention can be made by suspending the 2,4-dichloro-6-alkoxy-s-triazine in an aqueous solution of the tertiary phosphate and/or borate, preferably at room temperature, or slightly higher, e.g. 30° C., until complete dissolution of the different ingredients. The way in which the 2,4-dichloro-6-alkoxy-s-triazine is dissolved in the aqueous phosphate and/or borate solution is not important. For example, it is also possible to add the 2,4-dichloro-6-alkoxy-s-triazine in a solvent, e.g. acetone or in acetone-water or in dioxane to the aqueous phosphate and/or borate solution.

For formulating the hardening solution of the invention amounts corresponding to 1 mole of tertiary phosphate and 1.5 mole of metaborate are used per mole of 2,4-dichloro-6-alkoxy-s-triazine. However, if it is the intention to store the hardening solution before use, the phosphate and the borate are preferably used in excess of the above amounts since the acid hydrolysis products that gradually form reduce the stability, i.e. the hardening action of the solution. The excess of phosphate or borate should not be too high however, since it also reduces the stability by promoting further hydrolysis. Thus it is preferred to use an amount corresponding to from about 1 to about 3 moles of tertiary phosphate and to from about 1.5 to about 3 moles of metaborate per mole of 2,4-dichloro-6-alkoxy-s-triazine so that the solution is kept slightly alkaline (preferably between pH 7 and 10). It is also possible to add, after the formation of a solution with the above amounts of 1 mole of phosphate or 1.5 mole of metaborate per mole of 2,4-dichloro-6-alkoxy-s-triazine, the excess amount of buffering phosphate or borate. It is possible to buffer the aqueous solution of the hydrolysis product formed with phosphate by addition of borate or vice versa. The buffering with the borate is preferred since it produces very stable solutions that may be stored for months without loosing their hardening properties towards proteinaceous materials.

The concentration of 2,4-dichloro-6-alkoxy-s-triazine is only limited by the fact that no crystallization should occur in the solution at room temperature. For storing purposes the concentration should be as high as possible. Stable hardening solutions have been prepared based on 5, 8 and 10% by weight of 2,4-dichloro-6-alkoxy-s-triazine.

The aqueous hardener solutions, if necessary after dilution e.g. to a concentration corresponding to 3% by weight of 2,4-dichloro-6-alkoxy-s-triazine and after pH-adjustment, can be admixed directly with the aqueous protein solutions, especially aqueous gelatin solutions, to be hardened.

The hardening solution used according to the invention can be prepared more particularly as is illustrated by the following preparations.

Preparation 1

38 g (0.1 mole) of trisodium phosphate ($Na_3PO_4.12H_2O$) were dissolved in 250 ml of water and introduced in a reaction vessel provided with a stirrer and cooling means. Then 18 g (0.1 mole) of 2,4-dichloro-6-methoxy-s-triazine were added and suspended with stirring at 35°

C. for 6 h until the triazine compound was dissolved completely. The solution was filtered and diluted to 360 ml. A solution was obtained having a pH of 7.5.

In the same way other hardening solutions may be prepared wherein sodium phosphate is replaced by potassium phosphate or ammonium phosphate, wherein the concentration of 2,4-dichloro-6-alkoxy-s-triazine is changed and/or wherein the molar ratio of 2,4-dichloro-6-alkoxy-s-triazine to phosphate, which in the above preparation is 1:1, is varied from 1:1 to 1:3.

Preparation 2

The process of Preparation 1 was repeated with the difference that 47.5 g (0.125 mole) of trisodium phosphate and 18 g (0.1 mole) of 2,4-dichloro-6-methoxy-s-triazine were stirred at room temperature in 300 ml of water for 4 h until complete dissolution of the ingredients. The solution was filtered and diluted with water to 360 ml. A solution was obtained having a pH of 8.

Preparation 3

20.7 g (0.15 mole) of sodium metaborate ($NaBO_2.4H_2O$) were dissolved in 250 ml of water and introduced in a reaction vessel provided with a stirrer and cooling means. Then 18 g (0.1 mole) of 2.4-dichloro-6-methoxy-s-triazine were added and suspended with stirring at 35° C. for 8 h until complete dissolution. The solution was filtered and diluted to 360 ml. A solution was obtained having a pH of 7.

Preparation 4

The process of Preparation 3 was repeated with the difference that 82.74 g (0.6 mole) of sodium metaborate and 54 g (0.3 mole) of 2.4-dichloro-6-methoxy-s-triazine were stirred in 950 ml of water at 35° C. for 3 h. The mixture was further stirred over night at room temperature until complete dissolution, whereafter the solution was filtered and diluted with water to 1080 ml. The solution formed had a pH of 7.5.

The hardening solution according to the invention can be used with advantage for hardening of photographic silver halide gelatin emulsion layers, as well as backing layers, protective layers, filter layers, and other auxiliary layers which contain gelatin or other proteins. The swelling and solubility characteristics of the proteinaceous material, e.g. gelatin, are reduced to the desired degree by the hardening process described. A further advantage is that the layers do not become brittle.

A great advantage of the hardening solutions used according to this invention resides in the feature that they do not react under normal conditions with the colour couplers present in the colour photographic multilayer materials. Consequently, they can also be used in multilayer materials, in which nondiffusing colour couplers are present.

The hardening solution is generally added to the proteinaceous compositions, e.g. gelatin compositions, prior to coating. Normally these coating compositions have a pH from slightly acid to slightly alkaline, more particularly from about 6.5 to about 7.5. The viscosity of the coating solution is not raised. The amounts of hardening solution added depends on the desired effect and the concentration of initial 2,4-dichloro-6-alkoxy-s-triazine. In general 20 to 2000 ml and preferably from 100 to 1000 ml of hardening solution per kg of dry protein, e.g. gelatin, are added based on a solution with an initial concentration of 5% of 2,4-dichloro-6-alkoxy-s-triazine. The amount is reduced or increased proportionally to this concentration. In this way, layers with a high melting point and with increased abrasion resistance are obtained.

Besides gelatin other hydrophilic colloids may be present in the layers to be hardened, e.g. albumine, zein, dextranes, dextrin, starch ethers, agar-agar, arabic gum, alginic acid and its derivatives, cellulose derivatives, e.g. hydrolysed cellulose acetate with an acetyl content of up to 19–26% polyacrylamide, vinyl alcohol polymers with urethane/carboxyl groups or cyanoacetyl groups such as copolymers of vinyl alcohol and vinyl cyanoacetate, polyacrylamides, polyvinylpyrrolidones, polymers formed e.g. by polymerisation of proteins of saturated acylated proteins with vinyl monomers, polyvinylpyridines, polyvinylamines, polyaminoethyl methacrylates and polyethyleneimines.

The degree of hardening of the proteinaceous layers by means of the hardening solutions of the invention can be ganged by determination of the abrasion resistance of the hardened layers. An apparatus is used wherein a steel sphere is drawn over the samples, this steel sphere having a diameter of 6 mm. The sphere is charged with an increasing weight and the abrasion resistance is the lowest weight (in g) at which the sphere begins to leave a visible scratch on the layer. A high abrasion resistance corresponds with a high hardening of the proteinaceous layer.

Admixture of polyhydric alcohols having at least two hydroxyl groups with the hardening compounds of the invention results in gelatin-containing layers having much improved physical properties, in particular an improved hardness. Suitable polyhydric alcohols are those described in U.S. Pat. No. 3,898,089 and especially glycerol, trimethylolpropane, tri(2-hydroxyethyl) ether of glycerol and ADMUL-1483 which is the tradename of Food Industries Ltd. for a mixture mainly consisting of di-, tri- and tetraglycerol.

The invention is illustrated by the following examples.

EXAMPLE 1

A commercial photographic colour material for printing was used comprising in order on a support:
1. green-sensitive gelatin silver halide emulsion layers containing magenta colour formers,
2. red-sensitive gelatin silver halide emulsion layers containing cyan colour formers,
3. blue-sensitive gelatin silver halide emulsion layers containing yellow colour formers.

To the coating composition for a gelatin antistress layer that was applied on the above photographic colour material, aqueous solutions were added as follows:

Experiment 1

1 mole of 2,4-dichloro-6-methoxy-s-triazine was dissolved in acetone and the solution added as hardening solution, whereafter sodium hydrogen carbonate was added in equimolar amount with respect to the triazine derivative.

Experiment 2

2,4-dichloro-6-methoxy-s-triazine was partially hydrolysed with an aqueous solution containing sodium hydrogen carbonate in a ratio of 2:1 mole with respect to the triazine derivative. The solution formed was added as hardening solution to the coating composition for the gelatin antistress layer.

Experiment 3 hardening solution of Preparation 1 wherein 2,4-dichloro-6-methoxy-s-triazine was partially hydrolysed with an aqueous solution of an equimolar amount of trisodium phosphate.

Experiment 4 hardening solution of Preparation 3, wherein 1 mole of 2,4-dichloro-6-methoxy-s-triazine was partially hydrolysed with an aqueous solution of 1.5 mole of sodium metaborate.

The hardening solutions were added, after having been stored at 25° C. for 7 weeks in amounts corresponding to 3% by weight of the triazine derivative with respect to the amount of dry gelatin in the antistress layer.

The film samples were stored at 20° C. and a relative humidity of 60% for a time as indicated in the table hereinafter.

Thereafter they were immersed at 36° C. for 10 min in a colour developer having a pH of 10.2 and the abrasion resistance of the different layers was measured as indicated, the beginning of the scratch in the respective layers being visible by a difference in colour. The following results were obtained:

| Experiment no. | Stored at 20% C. and 60% R.H. for | Abrasion resistance (grams) | | |
|---|---|---|---|---|
| | | green-sensitive layer | red-sensitive layer | blue-sensitive layer |
| 1 | 5 days | 5 | 5 | 5 |
| | 14 days | 100 | 100 | 150 |
| 2 | 5 days | 50 | 50 | 150 |
| | 14 days | 150 | 150 | 350 |
| 3 | 5 days | 275 | 275 | 675 |
| | 14 days | 550 | 550 | 1050 |
| 4 | 5 days | 150 | 150 | 350 |
| | 14 days | 360 | 360 | 775 |

In Experiment 1, 2,4-dichloro-6-methoxy-s-triazine was applied to the coating composition for the antistress layer together with an equimolar amount of sodium hydrogen carbonate. If follows from the table that this combination did practically have no hardening effect on the gelatin antistress layer.

In Experiment 2, 2,4-dichloro-6-methoxy-s-triazine had been previously hydrolysed in aqueous solution with sodium hydrogen carbonate. The hardening effect was somewhat better than in Experiment 1, but still remained insufficient.

In Experiments 3 and 4 wherein hardening solutions according to the present invention are used, hardening was much better.

Moreover, in Experiments 1 and 2 carbon dioxide gas formation occurred during storage of the hardening solution and/or during the actual hardening of the antistress layer, resulting in bubble formation in the dried layer. No carbon dioxide gas formation occurred in Experiments 3 and 4, so that no gas bubbles were formed in the hardened antistress layer.

In these latter Experiments the hardening did not impair to a noteworthy extent the photographic properties of the film materials such as fog, gradation and sensitivity.

EXAMPLE 2

To both sides of an extruded polyethylene terephthalate film, which had been stretched longitudinally up to three times its original length, an adhesive layer was applied in a ratio of about 2 g/sq.m from an aqueous suspension containing:

| | |
|---|---|
| 20% latex of copolymer of vinylidene chloride, vinyl chloride, n-butyl acrylate and itaconic acid (30:50:18:2 % by weight) | 500 g |
| finely divided silica | 5 g. |

The latex was formed as described in Example 3 of U.K. Pat. No. 1,234,755.

The film coated in this way was then transversely stretched up to three times its original width, and thereafter heat-set while kept under tension at a temperature of 200° C. for about 1 min.

To both sides of the thus coated film a subbing layer was applied in a ratio of 0.4 to 0.6 g/sq.m from the following composition:

| | | |
|---|---|---|
| water | 554 | ml |
| gelatin | 8 | g |
| methanol | 396 | ml |
| HOSTAPAL W 5% solution in 50:50 mixture of water and ethanol | 4 | ml |
| ULTRAVON W 10% solution in water | 4 | ml |
| caprolactam | 4 | g |
| finely divided silica | 12 | g |
| hexanetriol | 2 | ml |

HOSTAPAL W is the trade name of Farbwerke Hoechst for a polyoxyethylene nonyl phenol, and ULTRAVON W is the trade name of Ciba-Geigy for the disodium salt of heptadecyl benzimidazole disulphonic acid.

To one side of the thus subbed dimensionally stable polyethylene terephthalate film a backing layer was applied at a ratio of 85 m/sq.m from a coating composition that in a first experiment was composed as follows:

| | |
|---|---|
| water | 900 ml |
| gelatin | 90 g |
| manganese dioxide | 5.5 g |
| saponin | 2 g |
| hardening solution of Preparation 4 | 21.6 ml |
| water to make | 1000 ml |

In a second experiment a similar backing layer was applied from a coating composition wherein the hardening solution of Preparation 4 had been replaced by a conventional hardener, viz. by 1.5 g of dimethylolurea.

Awaiting the application to the other side of the support of known light-sensitive silver halide emulsion layers, the coated films were wound up and stored. At different intervals the abrasion resistance of the backing layer was measured in both materials. The following results were found:

| | Abrasion resistance of backing layer (grams) | |
|---|---|---|
| Time of measurement | containing hardening solution of Prep. 4 | containing dimethylolurea |
| Immediately after application of backing layer | 50 | 25 |
| After 14 days of storage | 675 | 150 |

| | Abrasion resistance of backing layer (grams) | |
|---|---|---|
| Time of measurement | containing hardening solution of Prep. 4 | containing dimethylolurea |
| After 1 month of storage | 850 | 230 |

It results from these experiments that hardening of the material occurs much slower with the conventional dimethylolurea hardener and that the final abrasion resistance is reached much faster with the hardening solution of the invention.

We claim:

1. A process for hardening proteinaceous material, which comprises treating the proteinaceous material with an aqueous solution of the partial hydrolysis product of a 2,4-dichloro-6-alkoxy-s-triazine with a water-soluble tertiary phosphate and/or a water-soluble borate, said 2,4-dichloro-6-alkoxy-s-triazine corresponding to the formula:

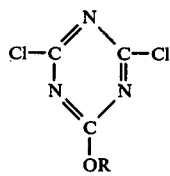

wherein R is a lower alkyl or alkoxyalkyl group.

2. A process according to claim 1, wherein the proteinaceous material is gelatin.

3. A process according to claim 1, wherein said water-soluble tertiary phosphate is selected from sodium, potassium and ammonium tertiary phosphate and polyphosphate.

4. A process according to claim 1, wherein said water-soluble borate is selected from sodium, potassium and ammonium metaborate and tetraborate.

5. A process according to claim 1, wherein in the formation of the aqueous solution an amount corresponding to 1 to 3 moles of tertiary phosphate or 1.5 to 3 moles of metaborate is used per mole of 2,4-dichloro-6-alkoxy-s-triazine.

6. A process according to claim 1, wherein between 100 and 1000 ml of said aqueous solution is used per kg of dry protein, said solution having a concentration of partial hydrolysis product corresponding to 5% by weight of 2,4-dichloro-6-alkoxy-s-triazine.

7. A process according to claim 1, wherein the proteinaceous material is a proteinaceous coating composition to form a photographic silver halide emulsion layer, a photographic backing layer, a photographic protective layer, a photographic filter layer, or any other photographic auxiliary layer of a photographic silver halide element.

8. A photographic material containing a support and one or more proteinaceous layers wherein at least one of said layers has been hardened according to the process of claim 7.